United States Patent Office 2,984,906
Patented May 23, 1961

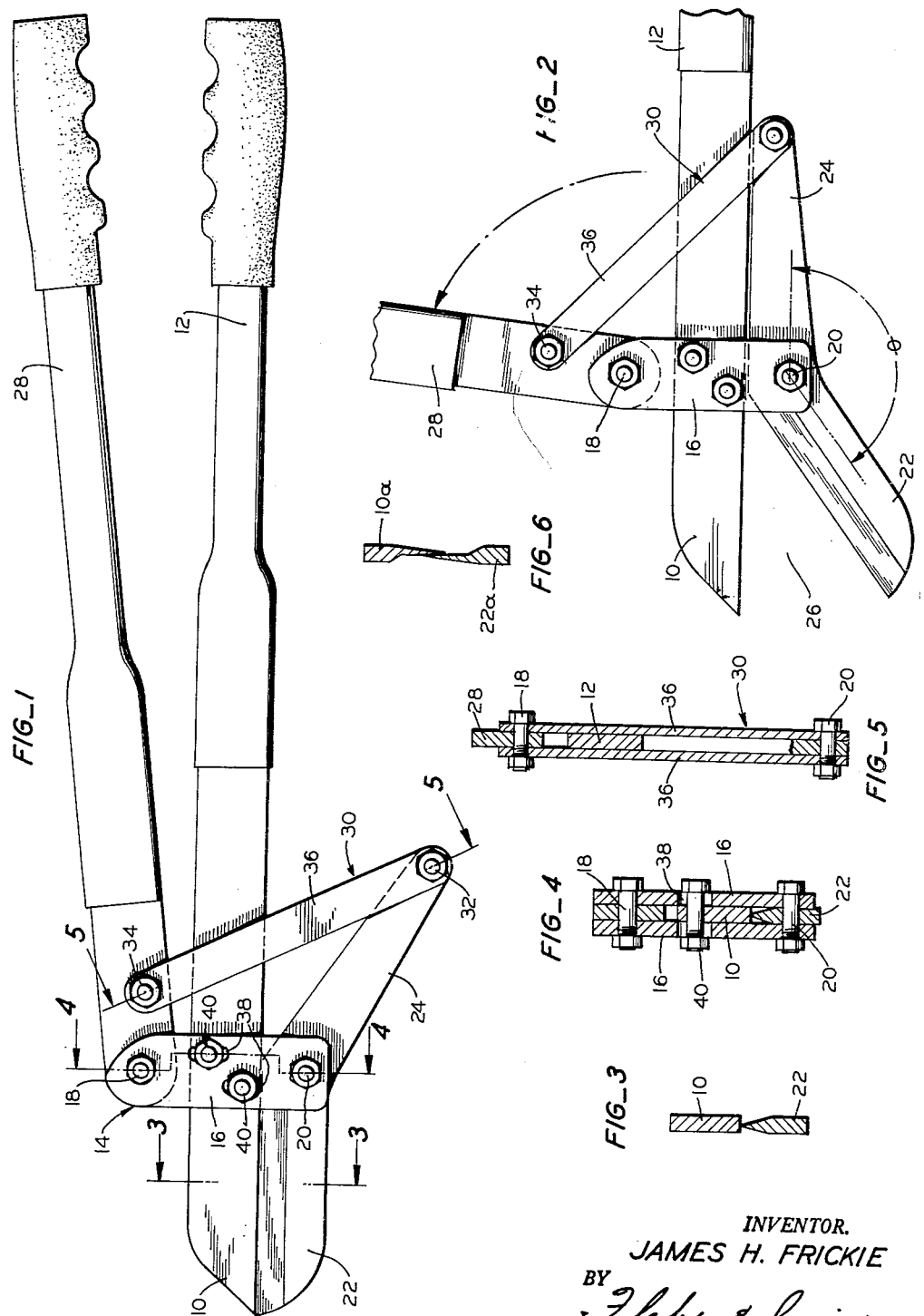

2,984,906
HEAVY DUTY CUTTER
James H. Frickie, 276 Cascade Drive, Mill Valley, Calif.
Filed July 20, 1959, Ser. No. 828,203
8 Claims. (Cl. 30—190)

This invention relates generally to cutting devices, and more particularly to a garden type cutting device adapted to light or heavy duty cutting operations.

Cutting devices, such as garden and pruning shears, have commonly employed crossed and pivoted blades to provide a scissors action. Lugs are generally provided to arrest the cutting action and springs to disengage the cutting blades to return them to an open position. While devices of this type have been widely sold and used, they have not been entirely satisfactory. For one thing, the shears are unable to withstand the lateral stresses normally encountered in the use of pivoted cross members, particularly when cutting flexible materials such as green branches, twigs, etc. The scissors action also produces a camming effect which tends to slide material forward within the blades during the cutting stroke, thereby reducing the leverage to an extent that efficient cutting becomes impossible. The provision of multiple links in series, in an attempt to solve the problem through increased leverage, has also proved unsatisfactory.

In general, the present invention is directed to what now seems a simple solution to the above and additional problems, as will appear. An object of the present invention therefore is to provide a heavy duty cutting device in which the blades and handles all operate in substantially the same plane, as it has been found that such construction successfully avoids the lateral motion normally encountered with the devices employing crossed members.

Another object of the present invention is to provide such a cutting device which provides substantially increased leverage and which is extremely effective in cutting flexible materials, as in pruning, etc.

Another object of the invention is to provide a cutting device of this character which is simple and inexpensive of construction and which does not require pivoted cross members, stop lugs, or springs to disengage the cutting blades.

Other objects and advantages of the present invention will be apparent from the following description and from the drawing in which:

Figure 1 is a view in side elevation of a cutting device incorporating the invention;

Figure 2 is a fragmentary view of the device of Figure 1, illustrating its operation;

Figure 3 is a view in transverse section along the line 3—3 of Figure 1;

Figure 4 is a like view along the line 4—4 of Figure 1;

Figure 5 is a like view along the line 5—5 of Figure 1; and

Figure 6 is a view like Figure 3 of a modified form of the invention.

Generally stated, the present invention is directed to a heavy duty cutting device in which the cutting blades and the handles are all adapted to operate in substantially the same plane. In the illustrated embodiment, a fixed blade is provided which has a rear extension forming a handle. Fulcrum means attached to the fixed blade provides pivots above and below the same for a movable power handle and a movable cutting blade. The latter is provided with a rear extension angularly disposed with respect to the cutting blade, and which is attached to the power handle by means of transverse link means. Preferably both the link and fulcrum means are composed of pairs of members which straddle the fixed blade, and which thereby insure operation of the blades and handle in the same plane. The invention also contemplates a fixed blade of the anvil type, against which the cutting blade impinges, although modifications to permit a slight scissors effect are within the scope of the invention.

Referring to the drawings in detail, 10 indicates a fixed cutting blade having a rearward extension forming the handle 12. As illustrated in Figure 3, this cutting blade can be substantially rectangular in cross section. Fulcrum means 14 which preferably comprise a pair of plates 16 are attached to the fixed blade so as to provide portions extending above and below such blade. As illustrated in Figure 4, the plates 16 provide a means to support a first pivot 18 above the fixed blade and a second pivot 20 below the fixed blade.

As best illustrated in Figures 1 and 2, the lower pivot or fulcrum 20 provides a means to support the cutting blade 22 for pivotal movements relative to the fixed blade 10. Such movement is made possible by the provision of a rear extension 24 on the cutting blade which is angularly disposed with respect to such blade. The size of the cutting opening 26 depends of course upon the size of the angle $\phi$ between the cutting blade 22 and the rear extension 24. As will be understood, the cutting angle at 26 is the supplement of the angle $\phi$. Thus in the illustrated apparatus, the cutting angle is approximately 34°. If a larger or smaller cutting angle is desired, the same can be accomplished by reducing or increasing the angle $\phi$ between the cutting blade 22 and the extension 24.

The desired power and leverage for heavy duty cutting operations is provided by the power handle 28 and the link 30 connecting the power handle to the rear extension of the cutting blade. As illustrated, the handle 28 is mounted on the pivot 18 for pivotal movements to provide the basic leverage. The link means 30 is in turn pivoted about the rear pivot or tail fulcrum 32 of the cutting blade and a thrust pivot or a power fulcrum 34 on the handle 28. The leverage or compounding proportion depends to a large extent on the length of the link means 30, and the spacing of the power fulcrum 34 from the pivot 18. A shorter linkage will increase the power but will also reduce the cutting angle 26. A longer linkage provides an opposite effect. Preferably the link means 30 comprises double link bars 36, one on each side of the fixed handle 12. This construction not only provides greater strength but insures that the blades, handles, and the link means will all operate in substantially the same plane during a cutting operation. This result is also insured by the plates 16 of the fulcrum means which in effect constitute a two sided housing within which occur the basic pivotal movements of the cutting blade 22 and the power handle 28.

It is a further feature of the invention that the rocker fulcrum or pivot 20 is adjustable with respect to its distance from the fixed blade 10. This feature facilitates proper alignment of the cutting blade with the fixed blade and also allows adjustable positioning of the blade to take up for wear caused by continued use. As particularly illustrated in Figures 1 and 4, such adjustment is made possible by the provision of slotted openings 38 for the means 40 clamping the fulcrum plates 16 to the fixed blade. This arrangement makes it possible to move the cutting blade closer to the stationary blade by the simple expedient of loosening and tightening the clamping means 40 to permit movement of the plates 16. It is contemplated that such adjustment will be customarily made, for example, to compensate for narrowing of the cutting blade due to grinding and resharpening. Preferably the inside surfaces of the clamping plate 16 are knurled, lightly grooved or otherwise roughened to resist any movement of the fulcrum means 14 during normal operation of the cutting device.

From the foregoing, it should be apparent that the present invention makes possible cutting operations involving compound leverage through use of a fixed and a shaped or angular cutting blade, with both blades being adapted to operate in the same plane and without use of crossed parts. Lateral motion and twisting effects normally encountered with prior art devices are thereby successfully avoided. The devices can also be constructed with double fulcrum plates and link bars which serve to further stiffen the handles and blades against twisting or lateral motion. The illustrated construction also makes possible a compounding proportion which is substantially greater than is possible with the customary scissors type action. While such compounding proportion can be varied by varying the positioning and angular relationship of the parts, I have found that an approximately 3 to 1 ratio (provided with the illustrated device) is most advantageous for general use and conventional materials of construction. By way of illustration, a cutting device constructed in accordance with the drawings will easily sever small branches up to 1 or more inches in diameter, without binding or twisting.

To those skilled in the art to which this invention relates, many changes in construction and widely differing embodiments and applications of the invention will suggest themselves without departing from the spirit and scope of the invention. For example, the basic assembly may be constructed for use as clamps or tongs by relatively simple alterations of the fixed and cutting blades. A scissors effect can also be accomplished, without loss of the advantages of operation in a single plane, by use of a suitable construction of the blades, for example, as in Figure 6. It should be understood therefore that the disclosures and description herein are purely illustrative and are not intended to be in any sense limiting.

I claim:

1. In a cutting device, a fixed blade including a handle and laterally protruding fulcrum means, an angular movable cutting blade in the same plane as said fixed blade, said cutting blade being mounted on said fulcrum means for pivotal movements relative to said fixed blade, a movable power handle in the same plane and likewise mounted on said fulcrum means for pivotal movement relative to said fixed blade, and link means connecting the rear of said cutting blade to said power handle, said link means reacting to forces in compression to close said blades in a cutting action.

2. A cutting device as in claim 1 wherein said link means comprises a pair of spaced apart members which straddle said fixed blade, to thereby insure operation of said blades in the same plane.

3. In a cutting device, a fixed blade including an integral handle, clamp means attached thereto and extending above and below said fixed blade, a cutting blade pivoted on said clamp means below said fixed blade, said cutting blade including a rear extension angularly disposed with respect to said cutting blade, a movable power handle pivoted on said clamp means above said fixed blade, and link means connecting said power handle to the rear extension of said cutting blade.

4. A cutting device as in claim 3 wherein said fixed blade, cutting blade, and fixed and movable handles are all in the same plane.

5. A cutting device as in claim 4 wherein said fixed blade is an anvil against which said movable cutting blade abuts.

6. A cutting device as in claim 3 wherein said clamp means comprises a pair of spaced apart elements attached on either side of said fixed blade, said elements supporting single pivots above and below said fixed blade for said power handle and cutting blade.

7. A cutting device as in claim 3 wherein said link means comprises a pair of spaced apart members, one on either side of said fixed handle, whereby operation of the blades and handles in the same plane is insured.

8. A heavy duty cutting device providing a minimum response to transverse thrust and twisting torque during the cutting operation, comprising: a fixed blade including a rear extension which forms a handle, fulcrum means including a pair of plate elements attached to said fixed blade, one on either side thereof, said fulcrum means including a first pivot supported by said plates below the fixed blade and a second pivot supported by said plates above said fixed blade, a cutting blade mounted on said first pivot, said cutting blade including a rear extension and being angularly disposed with respect to said cutting blade, a movable power handle mounted on said second pivot, and link means connecting said power handle to the rear extension of said cutting blade, said link means including a pair of spaced apart members adapted to straddle said fixed handle, the blade and handle portions of said shearing device all being substantially in the same plane.

References Cited in the file of this patent

UNITED STATES PATENTS

| | | |
|---|---|---|
| 633,736 | Schoonover | Sept. 26, 1899 |

FOREIGN PATENTS

| | | |
|---|---|---|
| 2,633 | Great Britain | of 1892 |
| 557,609 | France | May 8, 1923 |